Dec. 11, 1934.          A. G. HILLMAN                1,983,800
                      CINEMATOGRAPH CAMERA
                      Filed May 25, 1933         4 Sheets-Sheet 1
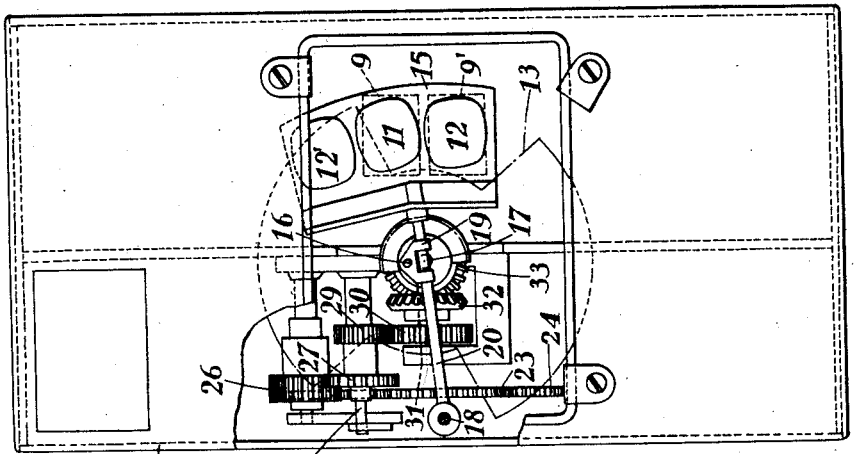
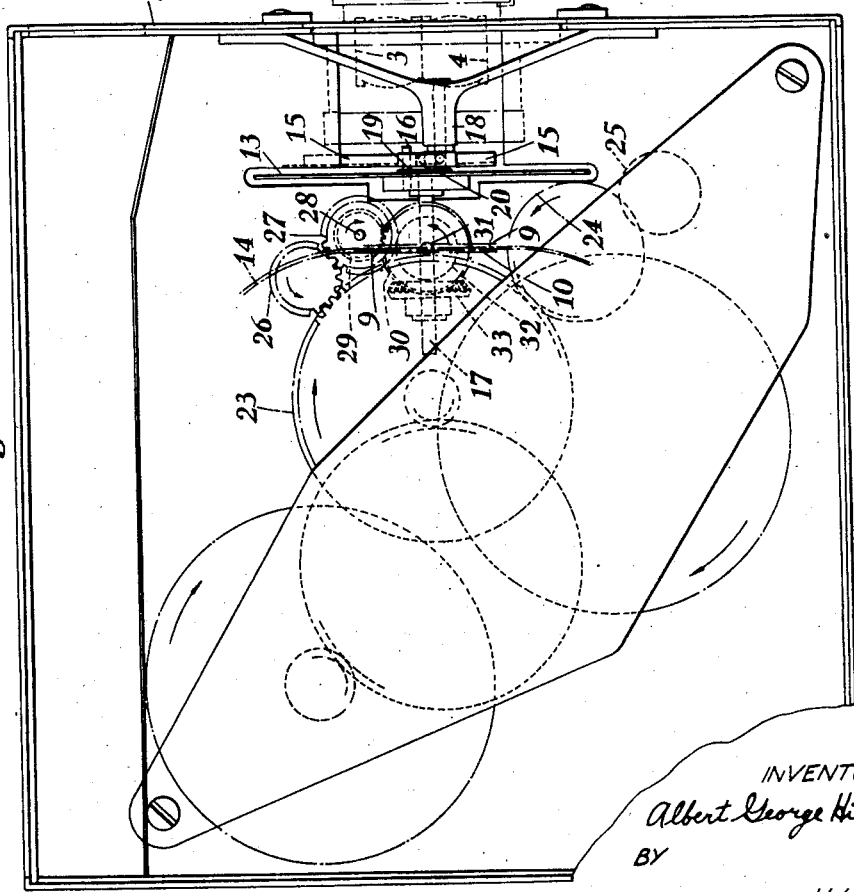
INVENTOR
Albert George Hillman
BY
Nathan, Barman & Helferich
ATTORNEYS Dec. 11, 1934.    A. G. HILLMAN    1,983,800
CINEMATOGRAPH CAMERA
Filed May 25, 1933    4 Sheets-Sheet 2

INVENTOR
Albert George Hillman
BY
Nathan, Bowman & Helferich
ATTORNEYS

Dec. 11, 1934.  A. G. HILLMAN  1,983,800
CINEMATOGRAPH CAMERA
Filed May 25, 1933  4 Sheets-Sheet 3

INVENTOR
Albert George Hillman
BY
Nathan, Bowman & Helferich
ATTORNEYS

Dec. 11, 1934.   A. G. HILLMAN   1,983,800
CINEMATOGRAPH CAMERA
Filed May 25, 1933    4 Sheets-Sheet 4
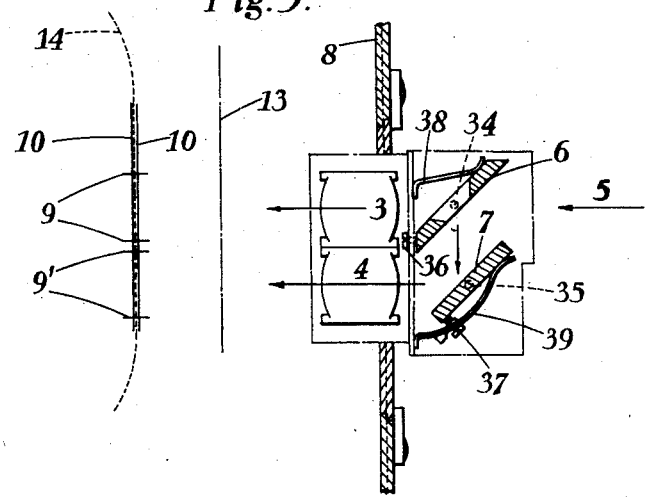
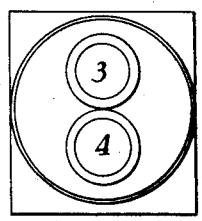
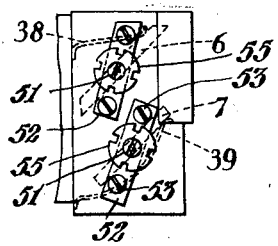
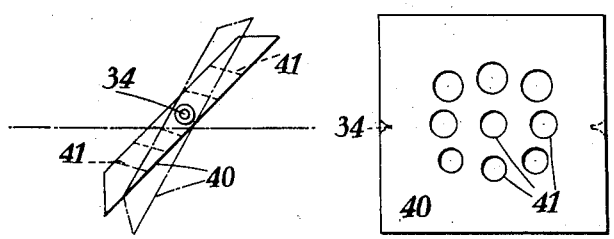
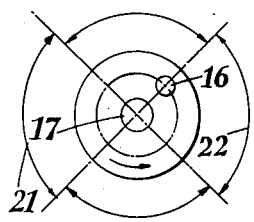
INVENTOR
Albert George Hillman
BY
Nathan, Bowman + Helferich
ATTORNEYS Patented Dec. 11, 1934

1,983,800

UNITED STATES PATENT OFFICE 1,983,800

CINEMATOGRAPH CAMERA

Albert George Hillman, London, England, assignor of one-half to Colourgravure Limited, London, England Application May 25, 1933, Serial No. 672,862
In Great Britain January 21, 1933

11 Claims. (Cl. 88—16.4)

The present invention relates to cinematograph cameras for producing colour sensation records suitable for subsequent reproduction on the screen by optical synthesis or the so-called additive method in which consecutive colour record images are simultaneously superposed, the red image through a red filter and the green image through a green filter.

The present invention relates to a camera suitable for the production on a negative band of colour constituent images (negatives) forming a continuous series, in which each negative (except the extreme negatives of the band) is exposed with the preceding negative, and also with the following negative, the exposures in each case being to the same beam which is divided by appropriate means, whereby parallax effects are eliminated or considerably reduced, the process for the production of such negatives forming the subject of my co-pending application Serial No. 707,431. Cameras, according to this invention have the advantage that standard width film and standard picture pull can be used.

Negative films produced by such method for two colour cinematography require that red and green filters be employed which are brought into position so that a pair of records of two colour sensations one after the other along the film is taken from the same aspect through such colour filters, the arrangement of the optical system and the colour filters being such that during the next exposure period following a shift period in which the film has been advanced an amount corresponding to a single picture pull, that picture of the pair which is the following picture in the direction of motion of the film through the gate, is again exposed with the same aspect through a like colour filter to that through which it was first exposed.

The positive band produced from such a negative is projected by optical superposition on the sheet of the colour constituent positives each through its corresponding colour screen, the positive band between projections being so moved onward, and the colour screening of the projection beams being so changed, that each constituent is projected through the same or a like colour screen first with the constituent positive image preceding it and next with the constituent positive which follows it along the length of the film.

Inasmuch as each image is thus projected first with the image preceding it and then with the following image it is of first importance that the images produced on the negative band shall be evenly spaced along the length of the band, for any departure from this condition will prevent accurate registration of the colour constituent positives on the screen and will result in double images and/or colour fringing, and this coupled with the difference in motion phase which has to be tolerated in each image produced as a result of exposure and re-exposure will preclude satisfactory exhibition with good definition and without colour fringing of the picture on the sheet.

For this reason the optical taking system must be capable of fine adjustment, must include positive and precise means for effecting adjustment to ensure the necessary accurate spacing of the image areas along the film, and must be such as to produce image areas of unvarying size.

The use of prismatic light-dividing systems for the purpose of the present invention is open to many objections, among which may be mentioned the difficulty of securing together the prism elements by an adhesive in the necessary accurate relationship, the aptitude of the elements to suffer relative displacement by the softening of the adhesive, the lack of any power of adjustment of the elements with respect to each other, and the liability which is always present in systems involving a mass of glass for extraneous or "ghost" images and images of unequal size to be produced. Adjustment of the image positions along the film by the lenses without other means of adjustment is very difficult to accomplish as the comparatively large lens unit does not lend itself to being finely adjusted and locked in the adjusted position whilst ensuring that image areas of equal size are produced.

The present invention broadly consists in a cinematograph camera for producing two or more colour constituents from the same aspect of view through a multiple windowed gate and in which the film is moved on to an extent permitting a re-exposure of the same picture area through the same or a like colour filter, having an optical light beam dividing and directing system composed of plane non-refracting reflectors and co-operating matched lenses through which the component beams are transmitted to a common focal plane, at least one of the reflectors being rotatably mounted about an axis parallel to the plane of the film in the gate and having fine adjusting means for rotating it and provision for maintaining it in a desired set position.

The location of the pivots must of course be performed with great care, but this can be effected by the skilled craftsman by known methods on the optical bench. The critical operation of securing the position of the images accurately in relation to the length of the film is then effected by a fine screw adjustment of a rotatable mirror, which permits of extremely sensitive manipulation and is capable of being readily locked in the desired adjusted position as determined by photographic tests.

If desired, each reflector can be rotatably mounted and provided with fine adjusting means, but if one of the reflectors is accurately secured by means within the knowledge of the skilled craftsman, the correct relationship of the image areas along the length of the film can be attained by providing the other reflector only with a means of fine adjustment.

A further important advantage of the present invention is that it can be used in conjunction with lenses of short focal length, e. g., 50 mm. or 24 mm., as now commonly used in cinematography, since no correcting block is required between the objective and the film such as is generally used in conjunction with prism systems.

A feature of the invention consists in the use of an oscillating sector carrying three filters arranged one after the other over substantially the same arc, the outside filters being of like colour, and preferably the oscillating motion is transmitted to the filter sector by a crank pin drive from the half speed shutter spindle conveniently through the medium of a sleeve slidably mounted on a pivoted rod on which the sector is mounted.

Such a filter changing device will effectively withstand continuous operation and is admirably suited to modern camera design.

In order that the present invention may be the more readily understood, reference is hereinafter made to the constructional form illustrated in the accompanying drawings, in which:—

Fig. 1 is a side elevation of a camera according to the present invention, and Fig. 2 is a front view thereof with the panel carrying the optical system removed.

Fig. 9 is a side sectional elevation of the panel carrying the optical system, and Figs. 10 and 11 are rear and side views of the optical system casing.

Fig. 12 shows a modification of the optical system hereinafter referred to.

Fig. 13 is a diagrammatic view showing a retarded and accelerated motion of the filters.

The negative film on which the pictures are taken in the camera should be of the panchromatic type and I have found that a standard supersensitive panchromatic film works well.

As colour filters for taking the negative film I have found standard two colour taking filters to work well, preference being at present had to a dense red filter not extending into the golden yellow of the spectrum and a green filter such that an image taken through it of a gradated black to white band will be of substantially the same density throughout as a similar image produced through such red filter.

Figure 3:
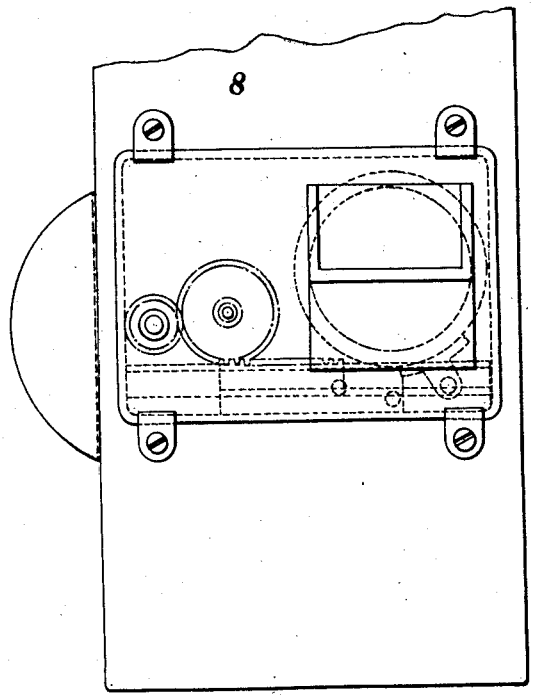
Fig. 3 is a front view with the panel in position.
Figure 4:
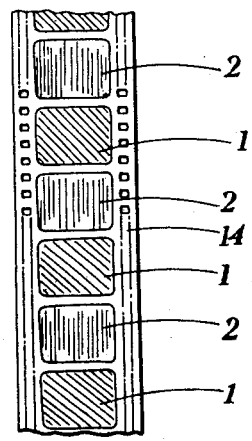
Fig. 4 shows a piece of standard size film which can be used for the negative and positive pictures.

For the purpose of taking each pair or sequence 1, 2 (Fig. 4) of the recurring sequences of two colour sensations from the same aspect, a non-refracting light dividing optical taking system is employed such as is illustrated in Fig. 9 in combination with a pair of paired lenses 3, 4, the light dividing system causing a branch beam to be separated from the entering beam of light 5 by reflectors 6, 7, the direct beam passing directly through the medially apertured reflector 6 and one lens 3 to the focal plane, while the branch beam is reflected by the imperforate reflector 7 to pass through the other lens 4 parallel to the direct beam to the same focal plane.

Optical flats 6, 7 of stainless steel are preferred. The mirrors are rotatably mounted about axes 34, 35 and are rotated by small amounts by the adjusting screws 36, 37 against springs 38, 39 pressing behind each reflector. This mounting allows the mirrors to be rocked away from the screws for cleaning purposes against the springs which cause the mirrors to return to correct position when released.

Any suitable provision is employed for locking the adjusting screws, e. g., set screws engaging them. The adjustment on the optical bench for parallelism of the pivots can be effected by mounting the pivots, viz., pointed screws 51, in appropriately operated slides 52 which are released for sliding by slackening screws 53. 55 are lock-nuts. Similar slides to those shown in Fig. 11 are arranged at the other side of the casing but operate in a direction perpendicular to the slides shown.

In the camera 8 a tandem two windowed gate 9, 9' and film track 10 are provided to permit simultaneous exposure to be made through the respective red and green filters 11, 12 (12'), the two paired lenses 3, 4 and the light dividing system 6, 7 providing for the taking of a like picture through each window 9, 9'.

To provide that each picture shall be formed by two exposures, one in each of the two gate-windows 9, 9', the two exposures being separated by a period of time during which the mechanical movements are carried out to make a picture shift after the shutter cover is completed, a diametral sectored opaque shutter 13 serves well which looking at the front of the camera rotates in an anti-clockwise direction (where the shutter is mounted as shown to the right of the gate) so as to provide that the time interval between each exposure shall be considerably shorter than if the shutter were to be rotated in a clockwise direction, because in the former case the direction of the film movement along the track 10 in shifting the picture areas 1, 2 from one gate window 9 to the next 9' is opposed to the direction of rotation of such shutter.

The intermittent mechanism employed may be of the usual or approved character giving the standard picture pull so that at the completion of the film shift movement to give a one picture pull, two consecutive picture areas 1, 2 are simultaneously exposed from the same aspect, and when exposure is completed for this picture pull, that exposed area 1 which is the following area in the direction of motion of the film 14 through the gate 9, 9' is transferred, in the next shift movement of the film, to the next gate window 9' for a second exposure, whilst the preceding window 9 provides for giving a first exposure of the next following picture area, the previously double exposed picture passing along the track.

The arrangement of the colour filters 11, 12 (12') is such that the cycle of operating two exposures of the same picture area includes the interposition of a like colour filter for each such exposure, e. g., if the exposure through the first window 9 is made through the red filter 11 (see Fig. 5) the simultaneous exposure through the second window will be made through the green filter 12 and, after the shift period is completed, the second exposure in the second window 9', being as it will be of the red record, must again be made through the red filter 11, and the first window 9 now being required for photographing a green record, will require the interposition of the green filter 12', (see Fig. 7).

This filter shift is synchronized with the picture shift timing of the camera, and for compactness it is convenient to employ an oscillating sector 15 carrying three filters arranged one after the other over substantially the same arc, the middle filter 11 being red and the outside filters 12, 12' being green.

As shown the oscillating motion is imparted to the filter sector 15 by a crank pin drive 16 from a shutter spindle 17 revolving at half the normal speed which in an ordinary black and white camera is one revolution for one picture shift. But this speed of the shutter may if desired be retained in which case the crank pin drive could be derived from a half speed secondary shaft. This oscillating sector 15 is pivotally anchored at one end 18, remote from the filters, to the camera framework, and the crank pin drive 16 is preferably transmitted to such oscillating sector 15 through the medium of a sleeve 19 slidably mounted on a rod 20 by which the sector 15 is pivotally mounted.

During the working of the camera, the filters will be continuously oscillating so that any slight defects in the filters will be smoothed out in the colour records.

The crank pin drive 16 provides for an accelerated motion of the filters over two opposing 90° motions 21, 22 of the crank, the end motions being considerably retarded over the other two opposing 90° motions, such retarded motions corresponding to the shutter exposure positions. There being three filters 11, 12 (12') and two gate windows 9, 9', two filters 12, 12' being like in colour and separated by another 11 unlike in colour, in the example shown two green filters 12, 12' separated by a red filter 11 and carried by the oscillating sector 15 and moving in timed relationship with the picture shift and shutter opening, there is always one filter in the inoperative position when exposure takes place, preceding in one exposure the first exposure window 9 and being at the next exposure in advance of the second exposure window 9'.

Figure 5:
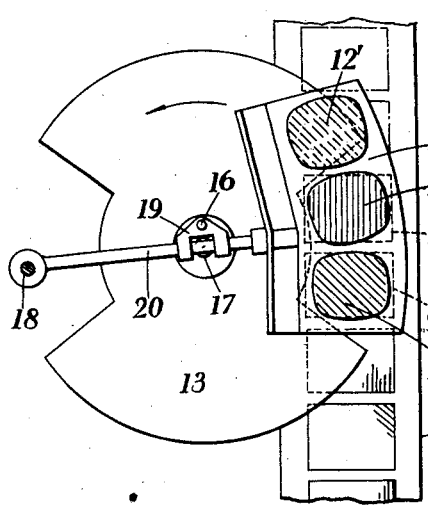
Figs. 5 to 8 show the shutter and the moving filter carrier in four successive positions representing 90° angular displacements of the shutter shaft.
Figure 6:
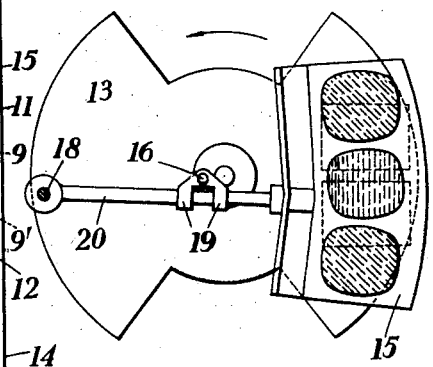
Figure 7:
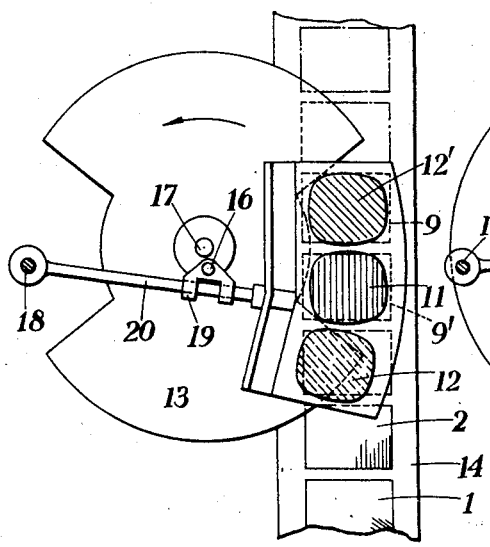
Figure 8:
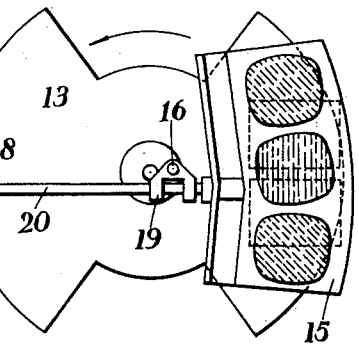

Figs. 5 to 8 represent respectively four successive positions of the shutter 13 and the sector 15 produced by successive 90° angular displacements of the rotating shutter spindle, Figs. 5 and 7 showing the position of the parts during exposure after approximately one-half of the retarded movement has been made, and Figs. 6 and 8 the positions during film shifts.

The drive of the rotating shutter shaft 17 and for the claw mechanism for imparting an intermittent movement to the film may be derived from the usual spring motors, the common toothed wheel 23 being geared up to the motors in the usual way. This wheel 23 drives toothed wheels 24, 25 which are related to the claw mechanism in well known manner such mechanism being not shown in the drawings since it forms no part of the present invention. The drive of the shutter shaft 17 from the wheel 23 is through a toothed wheel 26, and another 27 on the shaft 28 which carries a toothed wheel 29 meshing with another wheel 30 on a shaft 31 which carries a bevel wheel 32 engaging with a bevel wheel 33 on the shutter spindle 17.

The reflector 6 of the light dividing system depicted in Fig. 9 is provided with a single central aperture, but if desired, to permit the system to operate over a greater range of stops and to minimize parallax a reflector 40, (see Fig. 12) may be employed provided with multiple perforations 41 the axes of which may be inclined in one direction to favour one half of the picture area and the walls of which may be locally relieved or diminished through the thickness of the material to the reflecting face in another direction to favour the other half and thereby facilitate the passage of inclined rays and the effective illumination of the marginal portions of the picture area as described and claimed in my copending application Serial No. 664,943 filed April 7, 1933. In order that the axes of the holes may be inclined to the optical axis the mirror is rotated slightly from the position it is to occupy in use (see the full line position (Fig. 12)), to the dotted line position, the drilling tool being horizontal.

Cinematographic cameras of the character in general use do not provide sufficient space to run a rotating filter of the disc type having concentric coloured bands, whereas the oscillating mechanism of the character above described can be readily adapted to present day cameras. The oscillating principle further favourably reduces friction troubles and eliminates the slide guides which a rectilinear reciprocating motion would require. The present invention is however not to be regarded as limited to any particular method of interposing the colour filters at the proper time.

A camera substantially as above described will produce an alternating monochrome rendering of colour selections on standard film from which a direct positive can be printed in the usual manner.

For the purpose of identifying the respective colour records, the camera will conveniently and advantageously contain means to expose on the margins of the film or one of the frames an identity mark that will only be exposed to every other picture, and if this identity mark is exposed, say to the red record in the camera, the negatives will then contain a master key to be in turn printed on the positives. As this identity mark will always refer to the red record, the joining of the positives will then be an easy matter; titles and leads would be treated in a like manner and the threading of the projector will be done with the aid of this identity mark to position the red record with respect to the red filter.

It is found that in general no objectionable colour fringing steps in in the case of normally active moving subjects when employing a 2" focus lens, but for close up subjects the expedient may be adopted of employing a turret arrangement on the camera by which a lens of longer focal length can be readily substituted for dealing with close up subjects.

What I claim is:—

1. A cinematograph camera for producing colour sensation records, comprising a multiple windowed gate, a film track, an optical light beam dividing and directing system composed of plane non-refracting reflectors and co-operating matched lenses through which the component beams are transmitted to a common focal plane to produce a plurality of images from the same aspect of view on the picture areas exposed through said gate, at least one of said reflectors being rotatably mounted about an axis parallel to the plane of the gate, means for rotating said reflector for effecting fine adjustment of the images in the direction of the length of film and means for maintaining the desired adjusted relationship, and means for moving on the film to an extent permitting a re-exposure of the same picture area through the same or like colour filter.

2. A cinematograph camera for producing colour sensation records, comprising a multiple windowed gate, a film track, an optical light beam dividing and directing system composed of plane non-refracting reflectors and co-operating matched lenses through which the component beams are transmitted to a common focal plane to produce a plurality of images from the same aspect of view on the picture areas exposed through said gate, at least one of said reflectors being rotatably mounted about an axis parallel to the plane of the gate, fine screw adjusting means for rotating said reflector for effecting fine adjustment of the images in the direction of the length of the film, spring means for opposing the movement of said reflector and maintaining the desired adjusted relationship between the reflectors, and means for moving on the film to an extent permitting a re-exposure of the same picture area through the same or like colour filter.

3. A cinematograph camera for producing colour sensation records, and comprising a multiple windowed gate, a film track, an optical light beam dividing and directing system composed of plane non-refracting reflectors and co-operating matched lenses through which the component beams are transmitted to a common focal plane to produce a plurality of images from the same aspect of view on the picture areas exposed through said gate, said reflectors being rotatably mounted about axes parallel to the plane of the gate, means for rotating said reflectors for effecting fine adjustment of the images in the direction of the length of the film, means for maintaining the desired adjusted relationship, and means for moving on the film to an extent permitting a re-exposure of the same picture area through the same or like colour filter.

4. A cinematograph camera for producing colour sensation records, and comprising a multiple windowed gate, a film track, an optical light beam dividing and directing system composed of plane non-refracting reflectors and co-operating matched lenses through which the component beams are transmitted to a common focal plane to produce a plurality of images from the same aspect of view on the picture areas exposed through said gate, said reflectors being relatively adjustable for effecting fine adjustment of the images in the direction of the length of the film, and means for moving on the film to an extent permitting each picture area to be exposed first to the light of one component beam and after a cover period, to the light of another component beam through the same or like colour filters.

5. A cinematograph camera for producing colour sensation records, and comprising a multiple windowed gate, a film track, an optical light beam dividing and directing system composed of plane non-refracting reflectors and co-operating matched lenses through which the component beams are transmitted to a common focal plane to produce a plurality of images from the same aspect of view on the picture areas exposed through said gate, means for moving on the film to an extent permitting each picture area to be exposed first to the light of one component beam and after a cover period, to the light of another component beam, and an oscillating filter carrier working in timed relationship with the shutter so as to cause each re-exposure of the same picture area to be made through the same or a like colour filter to that through which the first exposure was made.

6. A cinematograph camera for producing colour sensation records, and comprising a multiple windowed gate, a film track, an optical light beam dividing and directing system composed of plane non-refracting reflectors and co-operating matched lenses through which the component beams are transmitted to a common focal plane to produce a plurality of images from the same aspect of view on the picture areas exposed through said gate, means for moving on the film to an extent permitting each picture area to be exposed first to the light of one component beam and after a cover period, to the light of another component beam, and an oscillating sector carrying three filters arranged one after the other over substantially the same arc, the outside filters being of like colour, said sector working in timed relationship with the shutter so as to cause each picture area to be re-exposed through the same or a like colour filter to that through which it was first exposed.

7. A cinematograph camera for producing colour sensation records, and comprising a multiple windowed gate, a film track, an optical light beam dividing and directing system composed of plane non-refracting reflectors and co-operating matched lenses through which the component beams are transmitted to a common focal plane to produce a plurality of images from the same aspect of view on the picture areas exposed through said gate, at least one of said reflectors being rotatably mounted about an axis parallel to the plane of the gate, means for rotating said reflector for effecting fine adjustment of the images in the direction of the length of the film and means for maintaining the desired adjusted relationship, an oscillating sector carrying three filters arranged one after the other over substantially the same arc, the outside filters being of like colour, and means for moving on the film to an extent permitting a re-exposure of the same picture area through the same or like colour filter.

8. A camera as in claim 7 in which the oscillating motion is transmitted to the filter sector by a crank pin drive from the half speed shutter spindle.

9. A camera as in claim 7 in which the oscillating motion is transmitted to the filter sector by a crank pin drive from the half speed shutter spindle through the medium of a sleeve slidably mounted on a pivoted rod which carries the sector.

10. A cinematograph camera for producing colour sensation records, and comprising a multiple windowed gate, a film track, a shutter and a half speed shaft therefor, an optical light beam dividing and directing system composed of plane non-refracting reflectors and co-operating matched lenses through which the component beams are transmitted to a common focal plane to produce a plurality of images from the same aspect of view on the picture areas exposed through said gate, means for moving on the film to an extent permitting each picture area to be exposed first to the light of one component beam, and after a cover period, to the light of another component beam, and an oscillating sector carrying three filters arranged one after the other over substantially the same arc, the outside filters being of like colour, said sector being driven by a crank pin drive from the half speed shutter shaft through the medium of a sleeve slidably mounted on a pivoted rod which carries the sector.

11. A cinematograph camera for producing colour sensation records, and comprising a multiple windowed gate, a film track, a diametral sectored shutter, an optical light beam dividing and directing system composed of plane non-refracting reflectors and co-operating matched lenses through which the component beams are transmitted to a common focal plane to produce a plurality of images from the same aspect of view on the picture areas exposed through said gate, at least one of said reflectors being rotatably mounted about an axis parallel to the plane of the gate, means for rotating said reflector for effecting fine adjustment of the images in the direction of the length of the film and means for maintaining the desired adjusted relationship, and means for moving on the film to an extent permitting a re-exposure of the same picture area through the same or like colour filter, said shutter being mounted so as to expose the windows of the gate successively and being connected to rotate in an anti-clockwise direction so that the direction of the shift movement of the film is contrary to the direction of rotation of the shutter.

ALBERT GEORGE HILLMAN.